United States Patent [19]
Shibata

[11] Patent Number: 5,781,098
[45] Date of Patent: Jul. 14, 1998

[54] THERMISTOR TYPE TEMPERATURE SENSOR WITH ADJUSTABLE OUTPUT SIGNAL INDICATIVE OF TEMPERATURE

[75] Inventor: Masamichi Shibata, Toyota, Japan

[73] Assignee: Nippondenso Co., Ltd., Kariya, Japan

[21] Appl. No.: 605,662

[22] Filed: Feb. 22, 1996

[30] Foreign Application Priority Data

| Feb. 23, 1995 | [JP] | Japan | 7-061635 |
| Sep. 19, 1995 | [JP] | Japan | 7-266298 |

[51] Int. Cl.⁶ .................................................. H01C 3/04
[52] U.S. Cl. .................. 338/28; 338/22 R; 338/29; 338/195
[58] Field of Search .................. 338/3, 7, 13, 14, 338/17, 22 R, 23, 25, 28, 29, 20, 31, 34, 195; 374/183, 184, 180, 181; 361/668; 324/149

[56] References Cited

U.S. PATENT DOCUMENTS

| 3,880,006 | 4/1975 | Poduje | 73/362 |
|---|---|---|---|
| 4,041,440 | 8/1977 | Davis | 338/195 |
| 4,114,447 | 9/1978 | Creach | 73/362 |
| 4,121,462 | 10/1978 | Mohrman | 73/362 |
| 4,151,503 | 4/1979 | Cermak et al. | 338/14 |
| 4,779,458 | 10/1988 | Mawardi | 374/41 |
| 4,818,363 | 4/1989 | Bayha | 338/34 |
| 5,073,034 | 12/1991 | Beran | 374/183 |
| 5,199,791 | 4/1993 | Kasanami | 374/185 |
| 5,350,237 | 9/1994 | Hida | 374/183 |
| 5,406,246 | 4/1995 | Friese | 338/22 R |
| 5,410,291 | 4/1995 | Kuzuoka | 338/22 R |
| 5,432,375 | 7/1995 | Agnvall | 257/467 |
| 5,600,296 | 2/1997 | Kuzuoka et al. | 338/22 R |

FOREIGN PATENT DOCUMENTS

| 0448414 | 9/1991 | European Pat. Off. . |
|---|---|---|
| 51-140669 | 3/1976 | Japan . |
| 55-85001 | 6/1980 | Japan . |
| 55-106327 | 8/1980 | Japan . |
| 55-130236 | 9/1980 | Japan . |
| 63-140930 | 6/1988 | Japan . |
| 3-010131 | 1/1991 | Japan . |
| 4-174319 | 6/1992 | Japan . |
| 5-34208 | 2/1993 | Japan . |
| 1072232 | 6/1967 | United Kingdom . |

*Primary Examiner*—Tu B. Hoang
*Attorney, Agent, or Firm*—Cushman Darby & Cushman IP Group of Pillsbury Madison & Sutro LLP

[57] ABSTRACT

A temperature sensor includes a temperature sensing section having a thermistor element 11 and connecting ends 121 and 122, an outside connection circuit having detecting resistors 211 to 213 and connecting ends 221 to 225, and a switching element 30 for obtaining a selective connection between the first ends 121 and 122 and the second ends 221 to 225. The switching element 30 is for example constructed by a connector 31 and a shunt wire 32. The second switching element 30 can, as an alternative, be constructed by a pair of connectors, which provide different mutual positions, one of which is selected to obtain a connection. As a second feature, a connector, which is separate from the thermistor element, is provided with adjusting resistors which are in series and in parallel connected to the thermistor element.

16 Claims, 6 Drawing Sheets

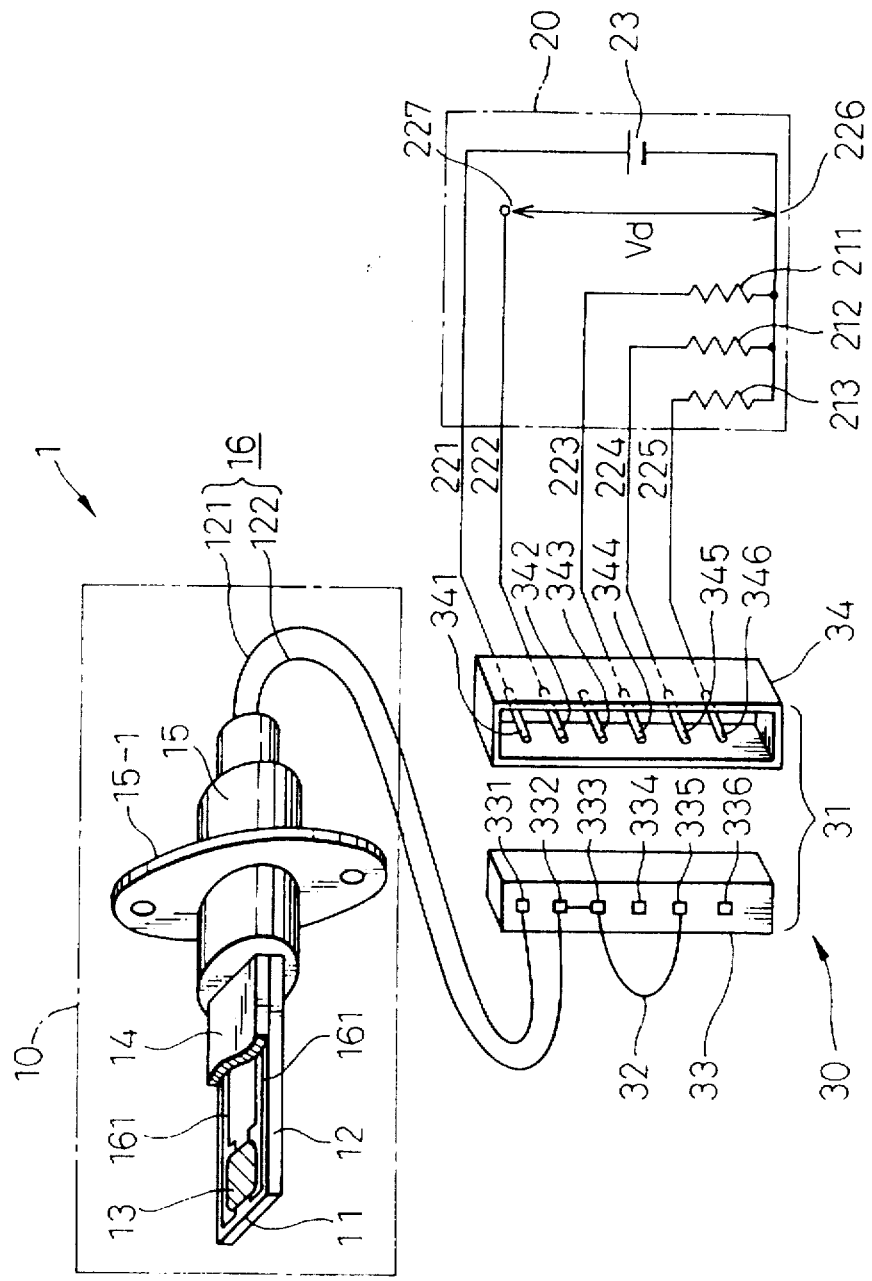

THERMISTOR TYPE TEMPERATURE SENSOR WITH ADJUSTABLE OUTPUT SIGNAL INDICATIVE OF TEMPERATURE

BACKGROUND OF THE INVENTION

1. Field of the Invention

The present invention relates to a thermistor type sensor for detecting a temperature of a gas, such as a temperature of an exhaust gas in an internal combustion engine.

2. Description of Related Art

A known thermistor type temperature sensor can be arranged in an exhaust pipe of an internal combustion engine for detecting a temperature of an exhaust gas of the internal combustion engine. Such a thermistor type of temperature sensor is usually constructed by a temperature sensitive section including a thermistor element arranged to be in contact with the exhaust gas, the value of an electric resistance of which element is varied in accordance with the temperature of the exhaust gas and by an outside electric circuit connected to the temperature sensitive section, which circuit is constructed by a detection resistor which is under a series connection with respect to the thermistor element and an electric power source which is connected to the series connection of the thermistor element and the detection resistor. An electric voltage across the detection resistor is varied in accordance with the change in the electric resistance value of the thermistor and corresponds to the temperature to be detected at the temperature detecting section.

The above type of temperature sensor is suitably used for detection of a temperature of an exhaust gas in an internal combustion engine. In this case, the temperature sensor is mounted to an exhaust manifold of the internal combustion engine which is under very severe conditions. Thus, the temperature sensor is constructed as a laminated structure, which includes a substratum made of an electric insulating material, on which the thermistor in a film shape is formed, and an electric insulating covering is formed on the film for obtaining protection of the film of the thermistor. In order to obtain such a laminated structure of the thermistor, the basic layer and the thermistor film are thermally press contacted with each other while being subjected to firing.

The laminated type of sensor is defective in that a variation of resistance values of products is large, which causes a yield to be reduced. Namely, a slight change of a production condition causes the resistance to be significantly changed, which causes its value to be located outside the permissible range. Such products of the values of resistance outside the permissible range must be discarded, which causes the yield to be inevitably reduced.

Japanese Patent Publication No. 55-85001 proposes a method for adjusting a variation in the value of resistance of a thermistor, wherein the thermistor has an electrode forming a recessed portion for adjusting the value of the resistance. Namely, the portion is selectively cut or trimmed so that the variation of the resistance value is located in the permissible range. However, this method is defective in its low productively, which inevitably causes production costs to increase.

Furthermore, Japanese Patent Publication No. 51-140669 discloses a method for the reduction of a variation in a resistance value in a thermistor for detecting a temperature, wherein a fixed resistor is connected to lead wires from the thermistor for correcting the resistance value at a high temperature.

However, in this method, a correction of a variation in a resistance value is done only at a single point in a region of a high temperature. Namely, a correction of a variation of resistance values along a desired range for a temperature detection can not be done. In other words, a correction of the measured values can only be done only in a very narrow range of temperatures, which causes the fields of use to be highly limited due to the fact that the range of the measuring temperature is narrow.

SUMMARY OF THE INVENTION

An object of the present invention is to provide a thermistor type temperature sensor capable of overcoming the above mentioned drawbacks in the prior art.

Another object of the present invention is to provide a thermistor type temperature sensor capable of correcting the variation of resistance values over a wide range of temperatures.

Still another object of the present invention is to provide a thermistor type temperature sensor capable of increasing the yield upon production of the same.

According to a first aspect of the present invention, an adjusting means is provided on the connector for carrying out the desired correction. Thus, the provision of the adjusting means on the connector allows an adjustment process to be effectively carried out so that the characteristic of the resistance is located within a permissible range, thereby increasing the yield.

Preferably, an outside circuit is provided, which incorporates therein a plurality detecting resistors one of which is selected by the switching means.

When the outside circuit is provided, a selection of a detecting resistor is done so as to cancel or reduce a variation in the resistance value of the thermistor, thereby preventing an output signal from being located outside a permissible range. In other words, the selected detecting resistor is the one that makes the voltage across the detecting resistor fall within a permissible range. As a result, a reduction becomes possible as to the number of thermistors having resistance values located outside the permissible range, thereby greatly increasing the yield. Such an increase in the yield can largely reduce a total production cost due to the fact that an increase in a cost caused by the provision of the detecting resistors as well as the switching means is relatively small.

According to another aspect of the present invention two kinds of adjusting resistors are provided, which are arranged in series and in parallel, respectively, with respect to the thermistor element, and these adjusting resistors are arranged on a member which is separate from the temperature sensing section.

The provision of the adjusting resistors according to this aspect of the invention allows resistance values to be adjusted at upper and lower limit values in the temperature range. Thus, a desired adjustment of the resistance value to a reference characteristic can be precise along the entire range of the detected temperature. Due to the arrangement of the adjusting resistors on the element which is separate from the temperature sensing unit it is possible to insulate the temperature sensing section, with respect to the heat condition, from the temperature sensing section as well as from a heat transfer from the atmosphere of the temperature sensing section, thereby suppressing a change in the resistance value of the adjusting resistors, thereby increasing a detecting precision.

The adjusting resistors which are made separate from the control section including the electric power source, are effective for obtaining a simplified construction. Namely, the adjusting resistors are to be subjected to an adjustment in accordance with a resistance value of the particular thermistor element. Thus, it is desirable that the adjusting resistors are made integral with the temperature sensing section. On the other hand, a separation of the detecting resistor from the thermistor element as well as the adjusting resistors allows the control section to be universal.

Regarding to yet another aspect of the present invention a relay unit including a connector is provided for connecting the temperature sensing unit with the outside control unit. As a result of the provision of the connector, a connection process between the parts is simplified. Furthermore, handling as well as maintenance are also simplified.

Preferably the adjusting resistors according to any of the foregoing aspects are trimmable resistors. As a result, a continuous change in the value of the resistor is obtained, thereby increasing precision during the adjustment, on one hand, and simplifying the adjusting operation, on the other hand.

According to still another aspect of the present invention a detecting resistor for taking out an output voltage is integrated with the adjusting resistors. As a result, only a supply of a predetermined voltage or current makes it possible to obtain an output signal. Namely, the temperature sensor is constructed by two parts, the temperature detecting section and the resistor section, thereby simplifying the entire construction. It should be noted that the detecting resistor referred to herein is a resistor which is arranged in series with respect to the temperature sensing section (temperature variable resistance section) and which functions as a resistor for generating an output which is a divided voltage.

The detecting resistor also may be a trimmable type of resistor. As a result, an adjustment is possible such that the resistance value of the detecting resistor is, in accordance with the resistance value at the temperature variable resistance section, adjusted to a value which maximizes the sensitivity. The sensitivity referred to here is a magnitude of a change in an output voltage in accordance with a temperature change.

BRIEF EXPLANATION OF ATTACHED DRAWINGS

FIG. 1 is a perspective view of a main part of a thermistor type sensor according to a first embodiment of the present invention together with a diagram of an outside circuit.

Figure 8:
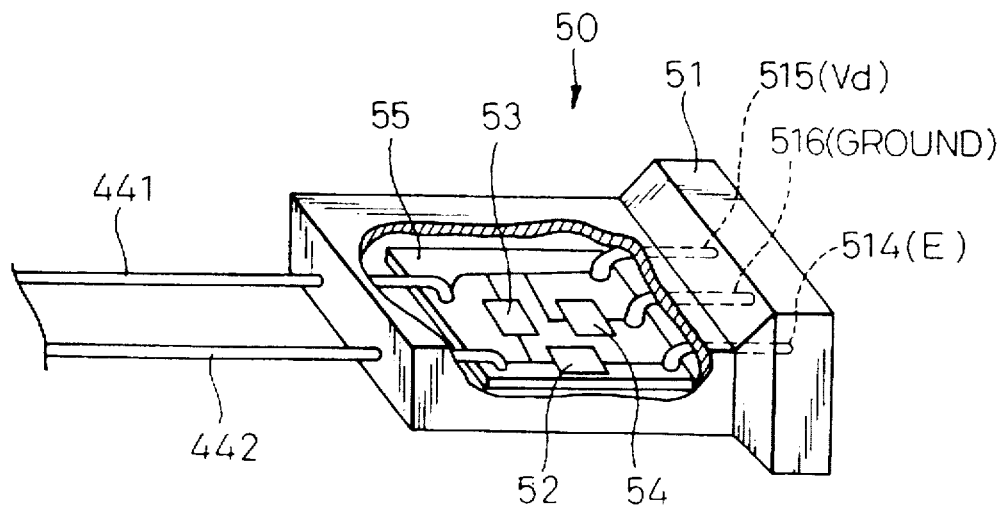

FIG. 8 partially shows a further embodiment.

DESCRIPTION OF PREFERRED EMBODIMENTS

Now, embodiments of the present invention will be explained with reference to attached drawings.

FIRST EMBODIMENT

In the first embodiment shown in FIG. 1, reference numeral 1 denotes a thermistor type temperature sensor which is constructed by a temperature sensing unit 10, an outside electric unit 20 which is electrically connected with the temperature sensing unit 10 as will be fully explained later and a switching unit 30 which is arranged between the temperature sensing unit 10 and the outside electric circuit 20. The temperature sensing unit 10 is provided, essentially, with a thermistor element 11 as a thick film, a substratum 12 on which the thermistor element 11 is located and which is made of an electrically insulating material, and a cover plate 14 made of an electrically insulating material for covering the thermistor. A pair of lead electrodes 161 made of an electrically conductive material such as a platinum are formed on the substratum 12 and are extended from respective ends of the thermistor elements. The temperature sensing unit 10 is further provided with a holder sleeve 15 made of a certain metal material in which the substratum 12 together with the cover 14 are sealingly stored. The holder sleeve 15 is integrally formed with a disk shaped portion or flange 15-1. In a well known manner, the holder sleeve 15 is inserted into a mounting hole in an exhaust pipe of an internal combustion engine (not shown) in such a manner that a detecting end of the temperature sensor unit 10 is contacted with a flow of the exhaust gas, while the flange 15-1 is contacted with an outer surface of the exhaust pipe. The flange 15-1 is sealingly connected to the exhaust manifold by means of suitable means such as bolts. In a well-known manner a change in a temperature of the exhaust gas which contacts the detecting end of the sensor 10 causes the electric resistance of the thermistor element 13 to be varied, thereby allowing the temperature to be detected by determining such a change in the electric resistance value.

As shown in FIG. 1, the outer circuit 20 includes detecting resistors 211, 212 and 213 of different resistance values which are in selective manner connected in series to the thermistor 13 and an electric power source 23.

The switching unit 30 is for the selective connection of the thermistor 13 with one of the detecting resistors 211, 212 and 213. The switching unit 30 includes a connector 31 constructed by a female connector 33 and a male connector 34 which are fitted with each other. Namely, the female connector 33 is constructed by an elongated rectangular shaped body formed with a series of female terminals 331 to 336. The made connector 34 is constructed with a body of an elongated rectangular box having an opening on its one side. A series of male terminals 341 to 346 are projected toward the opening. The male connector 33 is fitted to the rectangular opening of the male connector 34, which causes the male terminals 341 to 346 to connect with the female terminals 331 to 336, respectively. Furthermore, the switching unit 30 includes a shunt wire 32 for obtaining a desired selection of one of the detection resistors 211, 212 and 213, as will be described later. As a preferred embodiment, the connector 31 and the outer circuit 20 are constructed integrally.

As shown in FIG. 1, the electric power source 23 is, at its anode, connected to the male connector 34 at its terminal 341 via line 221. The electric power source 23 is at its cathode connected to a common line 226. The common line 226 is connected to the terminals 344, 345 and 346 via the detecting resistors 211, 212 and 231 and lines 223, 224 and 225, respectively. The outer circuit unit 20 is further provided with a detection terminal 227 for taking out an electric voltage Vd corresponding to a value of the electrical resistance of the thermistor element 13, which corresponds to the temperature of the exhaust gas in the exhaust pipe (not shown). The detecting terminal 227 is connected with the terminal 342 of the male connector 34 via a line 222.

A reference numeral 16 denotes a cable for connection of the female connector 33 with the temperature detecting unit 10. Namely, the cable includes a line 121 which is connected to the terminal 331, and a line 122 which is connected to the terminal 332. The latter terminal 332 is always connected with the terminal 333.

Figure 2A:
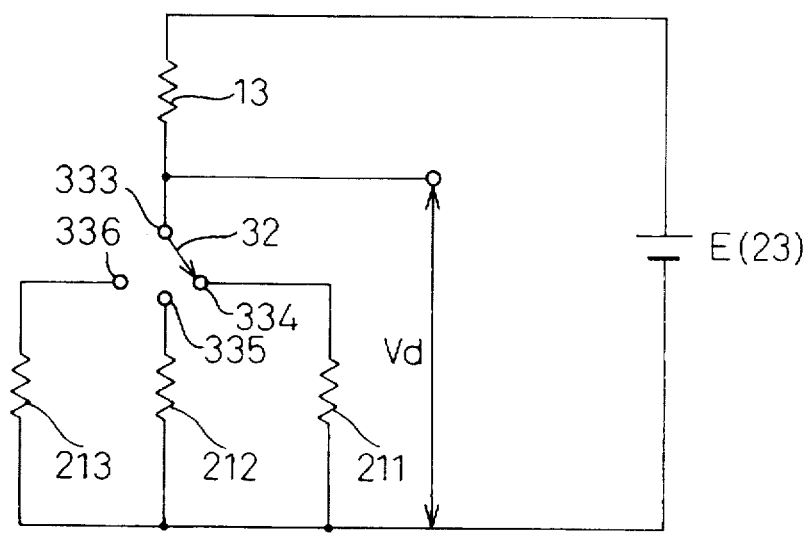
FIG. 2A shows a diagrammatic view of an entire electric circuit of the sensor in FIG. 1.
Figure 2B:
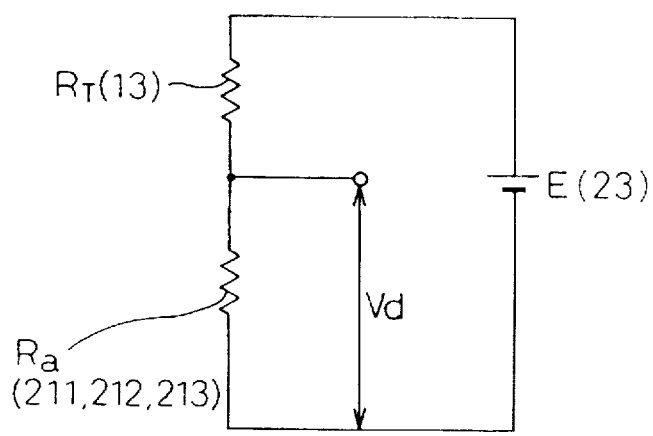
FIG. 2B shows a diagrammatic view illustrating a division of an output voltage in the sensor in FIG. 1.

The shunt wire 32 has a first end which is always connected to the terminal 333 and a second end which is selectively connected to the terminal 334, 335 or 336, which allows a desired one of the detecting resistors 211, 212 and 213 to be selected. FIG. 2A is a schematic diagram showing a selective connection of the thermistor 13 with the one of the detecting resistors 211, 212 and 213. A shunt wire 32 is, at the terminal 333, selectively connected to the selected one of terminals 334, 335 and 336, which are connected to the detecting resistors 211, 212 and 213, respectively. In any one of the three positions of the shunt wire 32, the thermistor 13 is under a series connection with the detecting resistor 211, 212 or 213, as shown in FIG. 2B. In FIG. 2B, $R_T$ is a resistance value of the thermistor 13, while $R_a$ is a resistance value of the detecting resistor Ra (211, 212 or 213) as selected by the shunt wire 32. An electric voltage Vd across the detecting resistor 211, 212 or 213 as selected is referred as a detecting voltage.

Now, a selection of one of the resistors 211 to 213 by using the switching unit 30 will be explained. A detecting voltage vd, which is a voltage across the detecting resistor Ra is expressed by $$Vd = \frac{Ra}{Ra + R_T} \times E \quad (1)$$

where E is a voltage of the electric source 23, Ra is a resistance value of the detecting resistor 211, 212 or 213 as selected by the switching unit 30 and RT is a resistance value of the thermistor element 13, which is basically varied in accordance with the temperature of the exhaust gas contacting the temperature sensor 1.

As explained above, the resistance value of the thermistor is determined in accordance with the temperature. Thus, at a predetermined temperature $T_0$ of for example 800° C., a resistance value of the thermistor element can be expressed by $Vd_0$. Thus, the above equation (1) becomes:

$$Vd_0 = \frac{Ra}{Ra + R_{T0}} \times E \quad (2)$$

Furthermore, a variation in the resistance value of the thermistor is inevitable, which causes the detecting voltage to be correspondingly changed. Namely, when the variation in the resistance value $RT_0$ is expressed by $\delta R$ and the change in the detecting voltage $Vd_0$ is expressed by $\delta V$, the above equation becomes:

$$Vd_0 + \delta V = \frac{Ra}{Ra + R_{T0} + \delta R} \times E \quad (3)$$

In order to obtain high precision detection of the temperature by the sensor 1, it is essential that the variation $\delta V$ in the detecting voltage $Vd_0$ be nullified irrespective of the inevitable variation $\delta R$ in the resistance value $RT_0$ of the thermistor. In order to do this, a suitable value of the detecting resistor should be selected. Namely, when a resistance value of the detecting resistor, which can nullify the variation $\delta V$ (=0) in the detecting voltage $Vd_0$, is expressed by Ra', the above equation becomes:

$$Vd_0 = \frac{Ra'}{Ra' + R_{T0} + \delta R} \times E \quad (4)$$

From the equations (3) and (4), the following equation is obtained.

$$\frac{Ra}{Ra + R_{T0}} \times E = \frac{Ra'}{Ra' + R_{T0} + \delta R} \times E \quad (5)$$

Thus, from the equation (5), the value Ra' of the detecting resistor, which satisfies the following equation, that is $$Ra' = \frac{Ra(R_{T0} + \delta R)}{R_{T0}} \quad (6)$$

can nullify the value of the change of the detection voltage $Vd_0$ regardless of the existence of the variation in the resistance value of the thermistor at the designated temperature of, for example, 800° C. In other words, by selecting one of the detecting resistors 211 to 213 of a resistance value, which is closest to the resistance value Ra', a reduction in the variation $\delta V$ in the detecting voltage $Vd_0$ is obtained, so that the detecting voltage of the thermistor at the predetermined temperature (800° C.) is within a permissible range, which allows the thermistor to pass the test. As a result, an increase in yield during the production of the thermistor is obtained. On the other hand, due to the provision of the detecting resistors 211 to 213 as well as the provision of the switching unit 30 which requires additional parts such as shunt wire 32, the production cost increases slightly. However, an effect of a reduction in the production cost by the increase in the yielding is much more superior than the effect of an increase in the production cost by the addition of the extra parts. As a result, a reduction of the total production cost can be obtained.

SECOND EMBODIMENT

Figure 3:
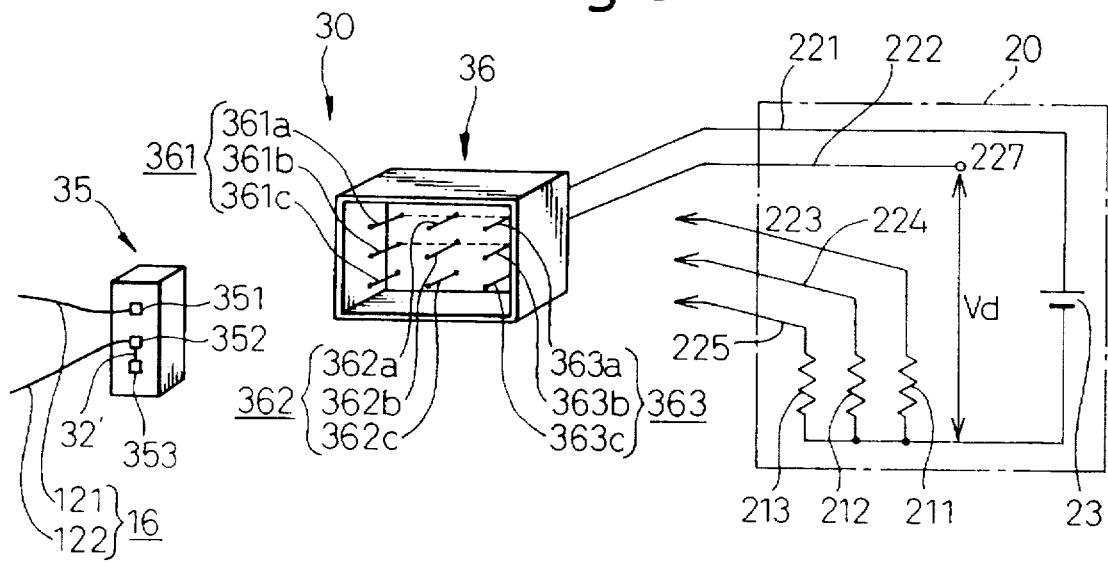
FIG. 3 is a perspective view showing a second embodiment of the present invention while its temperature sensing section is omitted for the sake of the simplicity.

In a second embodiment shown in FIG. 3, the switching means 30 is, in comparison with the first embodiment, modified in that it is constructed by a female connector 35 having female terminals 351 and 352, which are connected to the lines 121 and 122, respectively, of the cable 16 from the temperature sensor 1 and a female terminal 353, and a male connector 36 having a first, second and third male terminal sets 361, 362 and 367. The first set 361 has a first, second and third male terminals 361a, 361b and 361c, respectively. The second set 362 has a first, second and third male terminals 362a, 362b and 362c, respectively. The third set 363 has a first, second and third male terminals 363a, 363b and 363c, respectively. The terminals 352 and 353 of the female connector 35 are connected with each other by means of a shunt wire 32'. The first male terminals 361a, 362a and 363a are connected in series with each other and are connected to the line 221 of the outside electric source 20 (electric power source 221), while the second male terminals 361b, 362b and 363b are, also, connected in series with each other and are connected to the line 222 of the outside electric source 20 (detecting terminal 227). Furthermore, the third terminals 361c, 362c and 363c are connected to the lines 223, 224 and 225, respectively. The lines 223, 224 and 225 are connected to the detecting resistors 211, 212 and 213, respectively.

The female connector 35 can selectively take one of three positions with respect to the male connector 36. At a first position of the female connector 35, fitted to the female terminals 351, 352 and 353 are the male terminals 361a, 361b and 361c, respectively, of the first male terminal set 361, which allows the first detecting resistor 211 to be selected. At a second position of the female connector 35, fitted to the female terminals 351, 352 and 353 are the male terminals 362a, 362b and 362c, respectively, of the second male terminal set 362, which allows the second detecting resistor 212 to be selected. Finally, a third position of the female connector 35, fitted to the female terminals 351, 352 and 353 are the male terminals 363a, 363b and 363c, respectively, of the third male terminal set 363, which allows the third detecting resistor 213 to be selected.

In short, in the third embodiment, by selecting a desired position of the male connector from the first, second and third positions, a desired detecting resistor is selected among the three detecting resistors 211, 212 and 213. Other details of the second embodiment are the same as that in the first embodiment.

THIRD EMBODIMENT

Figure 4:
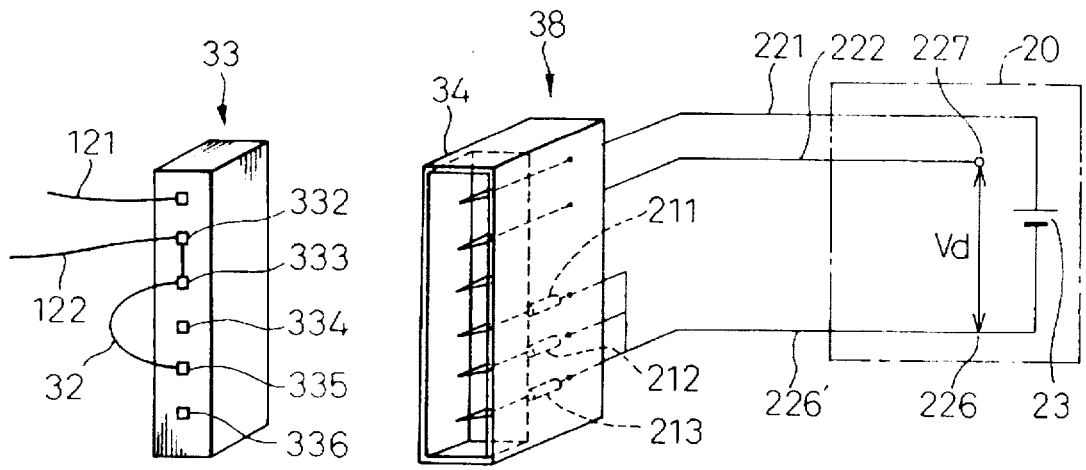
FIG. 4 is a perspective view showing another embodiment.

FIG. 4 shows a third embodiment, which features in its male connector 38 a portion 38 extending integrally therefrom, which portion 38 incorporates therein the detecting resistors 211, 222 and 213. This embodiment is advantageous in that only one outside line 226' is sufficient for connection of the detecting resistors 211 to 213 with the common line 226 of the outside detecting circuit 20. Namely, in the first and second embodiment, a provision of n detecting resistors requires n+z connecting wires. Contrary to this, in the third embodiment in FIG. 4, three wires 221, 222 and 226' are sufficient to connect the male connector 34 with the outside electrical unit 20.

The remaining construction of the third embodiment is the same as that in the first embodiment. In the third embodiment, the rearwardly extended portion 38 can be eliminated, while the detecting resistors 211 to 213 are provided in the female (or first) connector 33.

FOURTH EMBODIMENT

Figure 5:
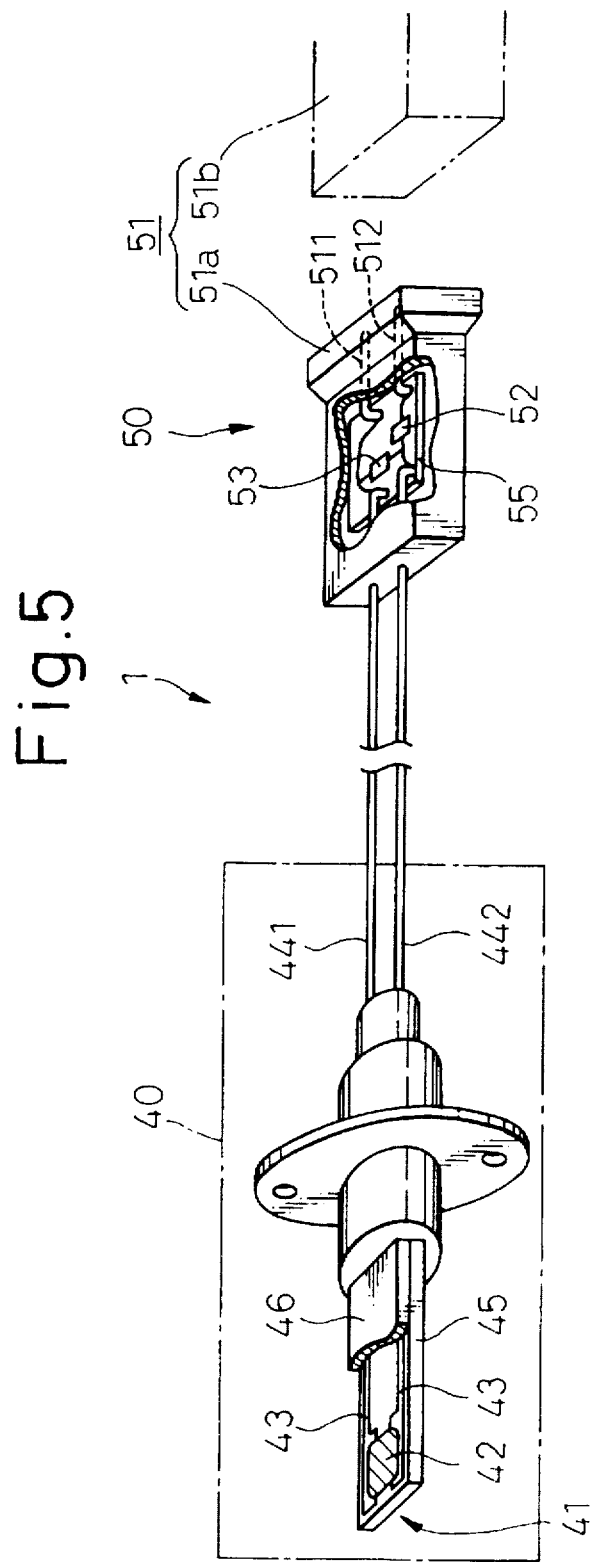
FIG. 5 shows temperature sensing unit and a connector in a still another embodiment.
Figure 6:
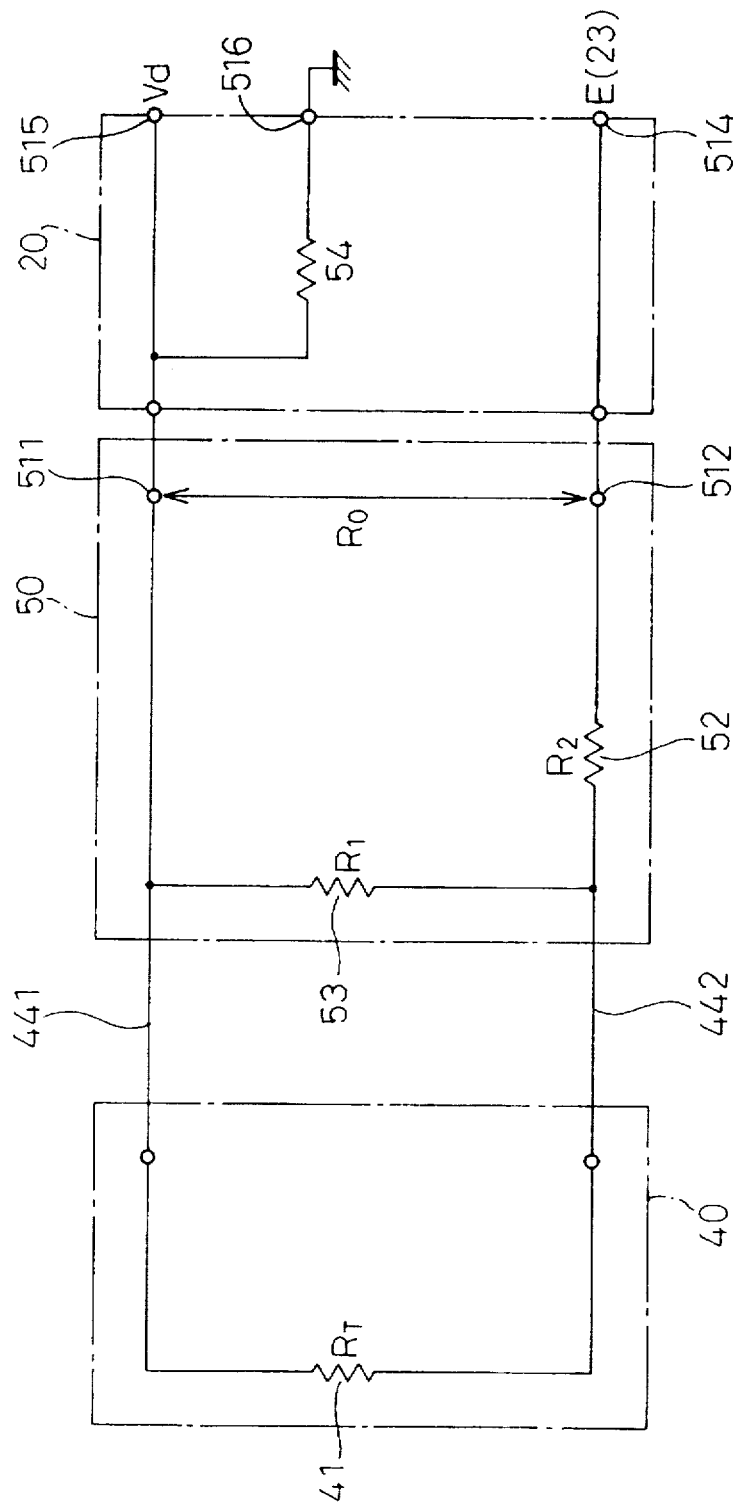
FIG. 6 shows a diagrammatic view of an electrical circuit of the sensor in FIG. 5.

FIG. 5 shows a fourth embodiment of the present invention, wherein the temperature sensor 1 is constructed by a thermistor unit 40 having a thermistor element 41, the resistance value of which is varied in accordance with the temperature, an outside circuit 20 shown schematically in FIG. 6, and a relay unit 50 for connecting the thermistor unit 40 with an outside detecting circuit 20 including an electric power source 23 and a detecting resistor 54.

As shown in FIG. 5, the thermistor unit 40 is constructed by a thermistor element 41 including a substratum plate 45 made of an electrically insulating material, a thin or thick thermistor film 42 on the substratum plate 45, and a cover plate 46 made of an electrically insulating material for covering the thermistor film 42. The relay unit 5 includes a connector unit 51 constructed by a male connector 51a and a female connector 51b, which is mated with the male connector 51a and which is shown schematically, and a substratum plate 55 on which pair of adjusting resistors 52 and 53 are formed. The adjusting resistor 52 and 53 having resistance value $R_2$ and $R_1$ respectively which are connected in series and in parallel, respectively, with respect to the resistor of a resistance value $R_T$ constructing the thermistor element 41 as shown in FIG. 6. The adjusting resistors 52 and 53 are of a trimmable type which allows their resistance value to be desirably adjusted by cutting parts thereof.

In order to produce the temperature sensor unit 40, a film shaped thermistor 42 as well as lead wires 43 made of platinum are created on the substratum plate 45 made of the electric insulating material, and then the plate 45 is covered by the plate 46, while the outer wires 441 and 442 are taken out from the lead wires 43. In order to produce the relay unit 50, the adjusting resistors 52 and 53 are formed on the printed circuit board 55, while these resistors 52 and 53 are connected to connector terminals (or pins) 511 and 512, respectively.

FIG. 6 illustrates how the thermistor 41 and the adjusting resistors 52 and 53 are electrically connected. In detail, the thermistor 41 of a resistance value $R_T$ is at its one end connected in series with the first adjusting resistor 52 of a resistance value of $R_2$, which is connected to the terminal 512 of the relay unit 50, while the other end of the thermistor 41 is connected to the terminal 511 of the relay unit 50. The second adjusting resistor 53 of a resistance value of $R_1$ is connected in parallel to the thermistor 41.

Figure 7:
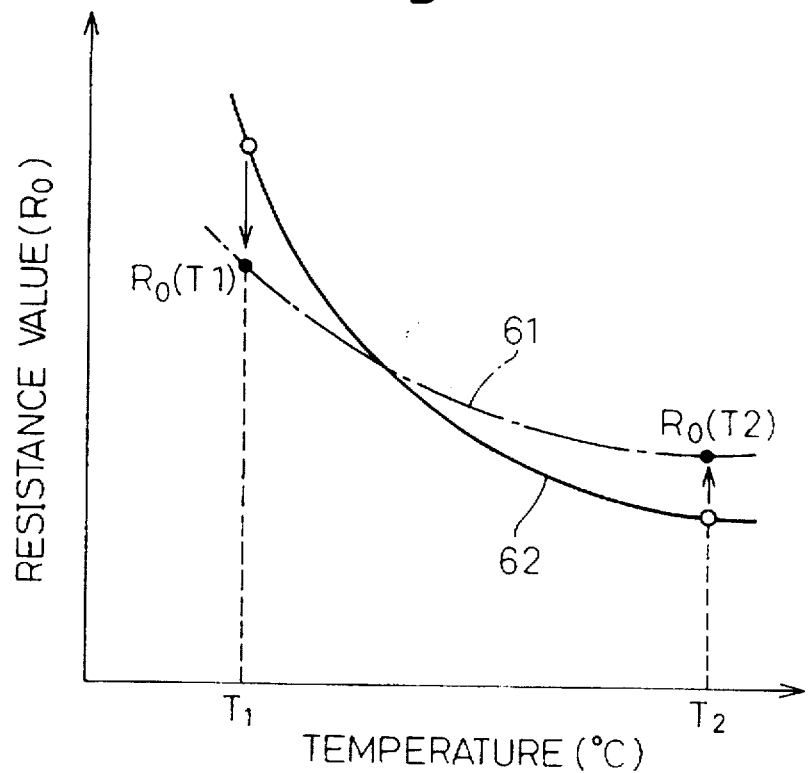
FIG. 7 shows the relationship between the temperature and the resistance value of the thermistor.

Now, a manner of an adjustment of the resistance value $R_T$ of the thermistor element 41 by means of the adjusting resistors 52 of the resistance value $R_2$ and 53 of the resistance value $R_1$ will be explained. First of all, the thermistor element 41 according to the present invention is of the type having a negative temperature coefficient (NTC). Namely, in the NTC type thermistor, as shown in FIG. 7, a resistance value is high when a temperature is low. Furthermore, as the temperature increases, the resistance value of the thermistor decreases along a logarithmic curve as shown by a curve 61 or 62 in FIG. 7.

The curve 61 in FIG. 7 shows a desired or target relationship between the temperature and the resistance value of the thermistor. The curve 62 shows a similar relationship for an actual product of a thermistor. Thus, the adjustment should be done so that the actual relationship 62 is corrected to the target relationship 61. Namely, in FIG. 6, a combined resistance of the thermistor 41 (of a resistance $R_T$), the first adjusting resistor 52 (of a resistance $R_2$) and the second adjusting resistor 53 (of a resistance $R_1$) is expressed by $R_O$. At a low temperature point ($T_1$), a value of the combined resistance $R_O$ should be adjusted to a lower value on the target curve 61 by means of the second adjustment resistor 53 of the resistance value $R_1$ which is in parallel to the thermistor 41. Contrary to this, at a high temperature point ($T_2$), a value of the combined resistance $R_O$ should be adjusted to a higher value on the target curve 61 by means of the first adjustment resistor 52 of a resistance value $R_2$ which is in series to the thermistor 41. However, the adjustment resistors 52 and 53 do not solely contribute to the value of the combined resistance $R_O$ at the respective temperature points. In other words, an adjustment of the resistance value by the adjustment resistor 52 or 53 at the designated temperature point causes the resistance value to be slightly varied at the opposite temperature point ($T_1$ and $T_2$). However, a desired selection of the resistance values $R_2$ and $R_1$ of the adjustment resistors 52 and 53 allows the adjusted temperature characteristic of the combined resistance to be substantially conformed with the target characteristic 61. As a result, even in a case where the resistance value of the thermistor is deviated from a target characteristic, a suitable adjustment of the adjusting resistors 52 and 53 allows the combined resistance value $R_O$ to be matched to the target characteristic 61 with high precision.

Now, a detail of the adjustment of the resistance values $R_2$ and $R_1$ of the adjustment resistors 52 and 53 will be explained. Namely, when a value of the resistance $R_T$ of the thermistor 41 at a temperature of $T_1$ (° C.) is expressed by $RT_1$, the combined resistance $R_O(T_1)$ at this temperature $T_1$ is expressed by:

$$R_0(T_1) = R_2 + R_{T1} \times \frac{R_1}{R_{T1} + R_1} \quad . \tag{7}$$

Similarly, when a value of the resistance $R_T$ of the thermistor 41 at a temperature of $T_2$ (° C.) is expressed by $R_{T2}$, the combined resistance $R_0$ ($T_2$) at this temperature $T_2$ is expressed by:

$$R_0(T_2) = R_2 + R_{T2} \times \frac{R_1}{R_{T2} + R_1} \quad . \tag{8}$$

By algebraically solving the above equations (7) and (8), values of the adjustment resistors $R_1$ and $R_2$ are obtained, which makes the combined resistance values $R_0$ ($T_1$) and $R_0$ ($T_2$) at the respective temperature points $T_1$ and $T_2$ conform with the target values on the desired curve 61, irrespective of the resistance values $R_0$ ($T_{T1}$) and $R_0$ ($T_{T2}$) of the thermistor. In other words, a trimming of the adjusting resistors 52 and 53 is done such that the resistance values $R_2$ and $R_1$ of the resistors 52 and 53 conform to the respective values as algebraic solutions of the above equations (6) and (7), which allows the temperature characteristic curve of the combined resistance $R_0$ in the temperature range $T_1$ to $T_2$ to precisely conform to the target characteristic curve 61.

According to the present invention, a wide range of selection of the values of the target resistance values $R_0$($T_{T1}$) and $R_0$ ($T_{T2}$) is obtained. As a result, a desired degree in a change in the resistance value with respect to the change in the temperature is obtained. In other words, a desired B-value, which is $$\frac{\Delta \log R}{\Delta \frac{1}{R}} \quad ,$$

is obtained.

Furthermore, according to the present invention, the adjusting resistors 52 and 53 are constructed as trimmable resistors, which is advantageous in that the above-mentioned adjustment process is simplified.

Furthermore, the trimmerable resistors 52 and 53 may be of a cubic shape, a so-called chip type, or a film shaped resistor printed on a printed circuit board.

Furthermore, the adjusting resistors 52 and 53 are arranged on the relay unit 50 which is located away from the temperature sensing unit 40. As a result, the adjusting resistors 52 and 53 are prevented from being substantially subjected to heat conduction from the temperature sensing unit 40 or a heat transfer from the air around the temperature sensing unit 40, which is advantageous in suppressing a change in the resistance value of the adjusting resistors 52 and 53, thereby increasing the detecting precision.

In short, the fourth embodiment as explained above is advantageous in that a correction in a variation in the resistance value of the thermistor element 41 becomes possible along a wide range of temperatures, which can increase the yield during production.

FIFTH EMBODIMENT

In a fifth embodiment in FIG. 8, which is a slight modification of the fourth embodiment in FIG. 5, together with the adjusting resistors 52 and 53, a detecting resistor 54, which is in series with respect to the thermistor element, is also mounted on the printed circuit board 55. In this embodiment, the detecting resistor 54 is of a trimmable type. Namely, the detecting resistor can be partly removed in order to allow its resistance value to be adjusted to a desired value.

In the operation of the fifth embodiment, together with the adjusting resistors 52 and 53, the detecting resistor 54 is mounted in the relay unit 50. As a result, only a connection of the relay unit to an outside power source allows a desired output voltage signal to be taken out between the terminals (outlet pins). In other words, an essential part of the sensor is constructed using only two parts, namely the temperature sensing section 40 and the relay part 50, which allows the entire construction to be greatly simplified.

An electrical connection of the connector 50 with a power source is similar as that in FIG. 6. Namely, a terminal 516 is grounded, while a voltage E of the power source is applied to the terminal 514. A detecting voltage Vd is taken out from the terminal 515.

In the fifth embodiment, the detecting resistor 54 is of a trimmable type. Namely, trimming of the detecting resistor 54 is done such that a value of the detecting resistor 54 is obtained, so that a sensitivity is adjusted to a desired value. In this case, the sensitivity is expressed by a magnitude of a change in an output voltage with respect to a change in the temperature.

In the embodiments, the adjusting resistors 52 and 53 are arranged on the connector. However, the adjusting resistors 52 and 53 can be arranged on a member which is separate from the connector.

Furthermore, in the embodiment, it is shown that each of the series adjusting resistor 52 and the parallel adjusting resistor 54 is constructed by a single resistor. However, each of the series adjusting resistor 52 and the parallel adjusting resistor 54 also can be constructed using a plurality of resistors.

I claim:

1. A thermistor type sensor comprising:
    a thermistor generating an electrical signal indicative of a temperature of a medium in contact therewith;
    an outside electric circuit for controlling said electrical signal from the thermistor;
    connector means having a thermistor-side connector on a thermistor side of the connector means and an electric-circuit-side connector on an electric circuit side of the connector means, said electric-circuit-side connector being connectable to said thermistor-side connector so as to electrically connect the thermistor to the outside electrical circuit; and
    adjusting means for obtaining a desired adjustment of the electrical signal from the thermistor, the adjusting means being located on the thermistor-side connector.

2. A sensor according to claim 1, wherein said adjusting means includes a plurality of adjusting resistors of different resistance values for a series connection to the thermistor for taking out a voltage signal corresponding to the temperature to be detected, and a selecting means for selecting one of the adjusting resistors.

3. A sensor according to claim 1, wherein said adjusting means comprises a first adjusting resistor which is in a series connection with the thermistor and a second adjusting resistor which is in a parallel connection with the thermistor, said first and second adjusting resistors being arranged so as to adjust a temperature characteristic of the thermistor.

4. A thermistor type sensor comprising a temperature sensing section including a thermistor and first connecting means for achieving an outside connection of the thermistor, an outside electric circuit having a plurality of detecting resistors which are in connection with the first connecting means of the temperature sensing section and second connecting means for achieving an outside connection of a selected one of the detecting resistors, and switching means arranged between the temperature sensing section and the outside electric circuit so that said selected one of the detecting resistors connects the first connecting means with the second connecting means, said switching means being on a thermistor side of said second connecting means.

5. A thermistor type sensor according to claim 4, wherein said switching means includes a connector comprising a first connector element having a first set of terminals connected with the first connecting means and a second connector element having a second set of terminals mated with the first set of terminals of the first connector element and connected with the second connecting means, and means for shunting desired mated pairs of the first and second terminals to select said selected one of the detecting resistors connecting the first and first connecting means.

6. A thermistor type sensor according to claim 5, wherein said second connector element and said outside electric circuit are made integral with each other.

7. A thermistor type sensor according to claim 4, wherein said switching means includes a connector comprising a first connector element having a first set of terminals connected with the first connecting means and a second connector element having a second set of terminals mated with the first set of terminals of the first connector element and connected with the second connecting means, the first and second connector elements being capable of mating such that a plurality of mated relative positions are obtained between the first and second connector elements, so that said selected one of the detecting resistors connects the first and second connecting means.

8. A thermistor type sensor according to claim 7, wherein said second connector element and said outside electric circuit are made integral with each other.

9. A thermistor type sensor according to claim 4, wherein said thermistor comprises a base plate made of an electrically insulating material, a thermistor film on the base plate, and a cover plate on the base plate arranged to cover the thermistor film.

10. A thermistor type sensor comprising a temperature sensing section including a thermistor element of a resistance value which is varied in accordance with a temperature to be detected and a plurality of adjusting resistors which are connected in series and in parallel, respectively, with the thermistor element, said thermistor element being formed by a substratum plate made of an electrically insulating material, a thermistor film for constructing the thermistor element on the substratum plate, and a cover made of electrically insulating material for covering the thermistor film, said adjusting resistors being formed on a member which is separate from said temperature sensing section and which is connectable to an outside electric circuit to form a connection between said member and said outside electric circuit, said connection having a thermistor element side connector and an electric circuit side connector so that, the adjusting resistors are on a thermistor element side of said connection.

11. A thermistor type sensor according to claim 10, further comprising a base plate on which the adjusting resistors are formed, said adjusting resistors on the base plate being trimmable to permit partial removal thereof, which allows the resistance value to be adjusted.

12. A thermistor type sensor according to claim 10, further comprising a detecting resistor for taking out an output signal, said detecting resistor being connected to a temperature variable resistor section including the adjusting resistors as well as the thermistor element.

13. A thermistor type sensor comprising a temperature sensing section of a resistance value which is varied in accordance with the temperature to be detected, a control section separate from the temperature sensing section and having an electric power source for feeding the temperature sensing section, and a relay section which is for connecting the temperature sensing section and the control section with each other and is separate from the temperature sensing section and the control section, said temperature sensing section comprising a base plate made of electrically insulating material, a thermistor film and a cover made of an electrically insulating material for covering the thermistor film, said relay section comprising a connector element including a male portion and a female portion which are capable of mating engagement with each other and a first one of which is connected to said temperature sensing section and a second one of which is connected to said control section, and a plurality of adjusting resistors which are connected in series and in parallel, respectively, with the temperature sensing section, wherein said adjusting resistors being located at said first one of said male and female portions thereby allowing a resistance value of the temperature sensing section to be adjusted.

14. A thermistor type sensor according to claim 13, wherein said relay section further includes a base plate, on which the adjusting resistors are formed, and wherein said adjusting resistors on the base plate are trimmable to permit partial removal thereof, which allows resistance values to be adjusted.

15. A thermistor type sensor according to claim 13, further comprising a detecting resistor for taking out an output signal, said detecting resistor being connected to a temperature variable resistor section including the adjusting resistors as well as the temperature sensing section.

16. A thermistor type sensor according to claim 15, wherein said detecting resistor is trimmerable to permit partial removal thereof, which allows the resistance value to be adjusted.

\* \* \* \* \*